United States Patent [19]

Wittmann et al.

[11] Patent Number: 4,963,619

[45] Date of Patent: Oct. 16, 1990

[54] MIXTURES OF POLYCARBONATES WITH SILOXANE-CONTAINING GRAFT POLYMERS

[76] Inventors: Dieter Wittmann, Bayer Aktiengesellschaft, P.O. Box 100140, D4047 Dormagen; Christian Lindner; Volker Damrath, both of Bayer Aktiengesellschaft, D 5090 Leverkusen, Bayerwerk all of Fed. Rep. of Germany; Hans-Jürgen Kress, Mobay Corporation, Plastic and Rubber Division, Bldg. 8, Mobay Rd., Pittsburgh, Pa. 15205; Horst Peters, Bayer Aktiengesellschaft, D 5090 Leverkusen, Bayerwerk; Jochen Schoeps, Bayer Aktiengesellschaft, P.O. Box 166, D 4150 Krefeld, both of Fed. Rep. of Germany

[21] Appl. No.: 266,802

[22] Filed: Nov. 3, 1988

[30] Foreign Application Priority Data

Nov. 6, 1987 [DE] Fed. Rep. of Germany ....... 3737637

[51] Int. Cl.$^5$ .............................................. C08G 63/48
[52] U.S. Cl. ........................................ 525/67; 525/63; 264/211
[58] Field of Search ...................... 525/63, 67; 264/211

[56] References Cited

U.S. PATENT DOCUMENTS 4,806,593  2/1989  Kress et al. ........................... 525/63
4,812,515  3/1989  Kress et al. ........................... 525/63

*Primary Examiner*—Melvyn I. Marquis
*Assistant Examiner*—Karen A. Hellender
*Attorney, Agent, or Firm*—Connolly and Hutz

[57] ABSTRACT

The invention relates to thermoplastic polycarbonate molding compositions containing polycarbonates, special siloxane-containing graft polymers and, optionally, other thermoplasts and/or standard additives and to a process for the production of the polycarbonate molding compositions.

11 Claims, No Drawings

MIXTURES OF POLYCARBONATES WITH SILOXANE-CONTAINING GRAFT POLYMERS

Mixtures of thermoplastic polycarbonates with graft polymers have long been known. Depending on the structure of the graft polymers, however, there is a need for improvement in resistance to ageing and weathering on the one hand and in low-temperature impact strength on the other hand in order to promote external application to an even greater extent, above all in the automotive industry.

According to EP-OS 0 135 794 (Le A 22 390), the polycarbonate component may be modified by incorporation of siloxane blocks in the polycarbonate component which, above all, increases toughness, particularly at low temperatures, and improves burning behavior (cf. for example page 15 of EP-OS 0 135 794). Despite favorable toughness at low temperatures, however, there are certain disadvantages arising out of the particular graft polymer components used.

EP-OS 0 022 979 and U.S. Pat. No. 4,305,856 describe polycarbonate/ABS mixtures to which a silicone is added in quantities of 0.05 to 3% by weight to improve mold release.

DE-OS 26 59 357 describes high-impact thermoplastic molding compositions containing 1 to 50 parts by weight of an elastomeric graft polymer obtained by polymerization of unsaturated monomers in the presence of organopolysiloxanes and/or silicone rubbers to 100 parts by weight of a thermoplastic plastic, for example polycarbonate.

According to DE-OS 26 59 357, the molding compositions show high low-temperature impact strength combined with high resistance to weathering and ageing, high surface quality, a pure natural color and high color stability without any significant deterioration in the original properties of the thermoplastic plastic (page 3, last paragraph of DE-OS 26 59 357).

EP-OS 0 034 748 (Le A 20 199) also describes high-impact polymers showing improved weather resistance which, in addition, may be mixed with thermoplastic polycarbonates and with polymethacrylates (cf. EP-OS 0 089 540/Le A 21 498). However, molding compositions such as these show unsatisfactory toughness at low temperatures for certain applications.

It has now been found that the property spectrum can be optimized in regard to low-temperature toughness and resistance to ageing and weathering by using graft polymers of silicone rubbers which, in turn, are prepared in the presence of a rubber-like polymer having a softening temperature (glass temperature) of $<0°$ C., preferably $<-20°$ C. and more preferably $<-40°$ C.

Accordingly, the present invention relates to thermoplastic polycarbonate molding compositions containing (A) 52 to 94% by weight and preferably 60 to 86% by weight of one or more polycarbonates and
(B) 6 to 48% by weight and preferably 14 to 40% by weight of one or more particulate graft polymers which are characterized in that the graft polymers can be prepared from
   B.1 20 to 90 parts by weight, preferably 30 to 80 parts by weight and more preferably 45 to 75 parts by weight of a polymer graft overlay of at least one $\alpha,\beta$-unsaturated, olefinic monomer on
   B.2 80 to 10 parts by weight, preferably 70 to 20 parts by weight and more preferably 55 to 25 parts by weight of a graft base having a core-/shell structure, consisting of a core (a) of rubber-like polymer of olefinically unsaturated monomers having a glass temperature (Tg) of $<0°$ C., preferably $<-20°$ C. and, more preferably, $<-40°$ C., and a shell polymer (shell) (b) of organopolysiloxane, the ratio by weight of the core (a) to the shell (b) being from 0.1:99.9 to 90:10 and preferably from 10:90 to 50:50 and the graft polymers (B) having an average particle diameter $d_{50}$ of from 0.05 to 10 $\mu$m, preferably from 0.1 to 2 $\mu$m and more preferably from 0.1 to 1 $\mu$m and the sum of the parts by weight of B.1 and B.2 always being 100 parts by weight.

The polycarbonates of component (A) are thermoplastic, aromatic polycarbonates obtained by reaction of diphenols, particularly dihydroxydiaryl alkanes, with phosgene or diesters of carbonic acid. In addition to the unsubstituted dihydroxydiaryl alkanes, those of which the aryl radicals carry methyl groups or halogen atoms in the o- and/or m-position to the hydroxyl group are also suitable. Branched polycarbonates are also suitable.

The polycarbonates of component (A) have weight average molecular weights $\overline{M}w$ of from 10,000 to 200,000 and preferably from 20,000 to 80,000, as determined for example by ultracentrifugation or scattered light measurement.

Suitable diphenols are, for example, hydroquinone, resorcinol, 4,4'-dihydroxydiphenyl, bis-(hydroxyphenyl)alkanes, such as for example $C_1$-$C_8$ alkylene and $C_2$-$C_8$ alkylidene bisphenols, bis-(hydroxyphenyl)-cycloalkanes, such as for example $C_5$-$C_{15}$ cycloalkylene and $C_5$-$C_{15}$ cycloalkylidene bisphenols, bis-(hydroxyphenyl)-sulfides, ethers, ketones, sulfoxides or sulfones. Other suitable diphenols are $\alpha,\alpha$-bis-(hydroxyphenyl)-diisopropylbenzene and also the corresponding nucleus-alkylated and nucleus-halogenated compounds. Preferred polycarbonates are based on bis-(4-hydroxyphenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxy-3,5-dimethylphenyl)-2,2-propane (tetramethylbisphenol A), bis-(4-hydroxyphenyl)-1,1-cyclohexane (bisphenol Z) and on trinuclear bisphenols, such as $\alpha,\alpha$-bis-(4-hydroxyphenyl)-p-diisopropylbenzene.

Other diphenols suitable for the production of the polycarbonates are described in U.S. Pat. No. 2,970,131, 2,991,273, 2,999,835, 2,999,846, 3,028,365, 3,062,781, 3,148,172, 3,271,367 and 3,275,601.

The thermoplastic, aromatic polycarbonates are either known from the literature or may be obtained by methods known from the literature.

The graft polymers (B) are the subject of German patent application P 37 20 475.0 (Le A 25 251) while the graft base according to B.2 is the subject of German patent application P 37 04 657.8 (Le A 25 012).

According to patent application P 37 04 657.8, the multiphase polymers serving as the graft base B.2 have average particle diameters of from 0.05 to 10 $\mu$m, preferably from 0.1 to 2 $\mu$m and more preferably from 0.1 to 1 $\mu$m.

The production of the graft polymers B) to be used in accordance with the invention by way of the graft base B.2 is described in German patent application P 37 20 475.0, from which the following passages are taken:

The cores (a) of organic, rubber-like polymer having a softening temperature (glass temperature) below 0° C., preferably below $-20°$ C. and more preferably below −40° C. themselves have average particle diameters (d$_{50}$) of from 0.05 to 2 μm and preferably from 0.09 to 0.5 μm. They may be uncrosslinked, partially crosslinked or highly crosslinked, particles of at least partly crosslinked polymer being preferred. The core material (a) is a rubber-like homopolymer or interpolymer of at least one olefinically unsaturated monomer, more especially a diene, such as butadiene, isoprene, chloroprene, an olefin, such as ethylene, a vinyl ester, such as vinyl acetate and vinyl propionate, and an alkyl acrylate, such as ethyl, butyl, hexyl acrylate, i.e. monomers which are capable of forming a rubber-like polymer, optionally together with other monomers, such as styrene, acrylonitrile, alkyl methacrylate, acrylic acid, methacrylic acid, acrylamides, α-methyl styrenes. Preferred core materials are olefin rubbers and alkyl acrylate rubbers.

The material of the shell (b) according to German patent application P 37 20 475.0 is a homopolymer or interpolymer of organopolysiloxanes consisting essentially of units corresponding to the following general formula $$R_n SiO_{\frac{4-n}{2}} \qquad (I)$$

in which R is an organic radical and n is a number having an average value of 1 to less than 3.

R may be a monofunctional hydrocarbon radical, for example a C$_1$–C$_{18}$ alkyl radical, for example methyl, ethyl, or a C$_6$–C$_{10}$ aryl radical, such as phenyl. R may also be a monofunctional hydrocarbon radical reactive to radicals, more especially vinyl, allyl, chloroalkyl, mercaptoalkyl, acryloxypropyl. At least 80% of all the radicals R are preferably methyl groups.

The graft overlays (c) present in the graft polymers according to German patent application P 37 20 475.0 are polymers of α,β-unsaturated monomers, preferably vinyl monomers. Suitable monomers are, for example, styrene, α-methyl styrene, p-methyl styrene, halogen styrene, acrylonitrile, methacrylonitrile, vinyl halides (vinyl chloride), maleic imides, maleic acid derivatives, vinyl acetate, vinyl propionate, alkyl (meth)acrylates (containing up to 10 carbon atoms in the alcohol part), vinyl ethers, conjugated dienes, such as butadiene, chloroprene, and α-olefins, such as ethylene, propene, butene. Styrene, acrylonitrile, propene, ethylene and butene are particularly preferred.

The graft overlays (c) may be homopolymers or copolymers of at least two of the above-mentioned monomers.

The graft overlay (c) is at least partly graft polymerized onto the silicone rubber, i.e. joined chemically thereto. In preferred graft polymers, more than 50% by weight of the graft overlay is chemically joined (graft polymerized) to the graft base.

The graft polymers according to German patent application P 37 20 475.0 may be prepared as follows:

In a first step, an emulsion of the core material (a) is prepared by dispersion polymerization known per se of the corresponding monomer(s). Monomers are preferably polymerized in aqueous emulsion in the presence of surface-active agents and, optionally, initiators. The particle diameter of the polymers may be regulated by variation of the polymerization conditions. The emulsion polymerization is normally carried out at 10° to 100° C. Preferred emulsions of the core material (a) have a pH value below 7 and are prepared with anionic emulsifiers, more especially salts of sulfonic acids or organic sulfates. The particle diameters of the latices accumulating may be regulated in particular through the monomer/emulsifier/water ratio. If the cores (a) are to be at least partly crosslinked, the monomers forming the core material may be polymerized in the presence of polyfunctional vinyl or allyl monomers, more especially in quantities of up to 5% by weight, based on the monomers. Suitable crosslinking monomers are, for example, divinylbenzene, bisacrylates, bisacrylamides, vinyl acrylates, triallyl cyanurate,-isocyanurate,-phosphate,-citrate, butadiene, isoprene.

In a second step, the organopolysiloxane forming the shell (b) is prepared by emulsion polymerization in the presence of the emulsion of the core material (a) prepared in the first step by dispersing low molecular weight organosiloxanes in the latex from the first step and polymerizing the resulting dispersion, optionally in the presence of an emulsifier in the quantity required for a stable emulsion and a catalyst. The coarsely dispersed organosiloxane need not be mechanically emulsified, for example in high-speed stirrers (Ultraturrax), colloid mills or high-pressure homogenizers, before the polymerization. Instead, emulsification and polymerization are preferably carried out at the same time. In this way, the organopolysiloxane formed is, surprisingly, graft-polymerized onto the core material (a) prepared in the first step.

To increase the polymerization velocity, the reaction temperature may be increased to around 40° to 100° C.

The particle diameters of the polymers of the second step may also be regulated by varying the polymerization conditions, for example by using nonionic co-emulsifiers, through the ratio of emulsifier to organosiloxane and through the choice of core materials having suitable particle diameters.

The organosiloxanes used for the preparation of (b) may be known compounds, including above all cyclic organosiloxane oligomers, for example octamethyl cyclotetrasiloxane and decamethyl cyclopentasiloxane. Alkoxy silanes and alkoxysiloxanes, in which the alkoxy group contains from 1 to 4 carbon atoms, are also suitable. Examples of suitable alkoxysilanes are methyl triethoxysilane, 3-aminopropyl trimethoxysilane and 3-mercaptopropyl methyl dimethoxysilane.

Polysiloxanes, more especially α,ω-polysiloxane diols, having a molecular weight of 2000 to 5000 and a viscosity of 50 to 150 mPa.s at 25° C. are also suitable for the process of step 2.

The organopolysiloxane of the shell (b) may be partly crosslinked in accordance with German patent application P 37 20 475.0. Branches or crosslinks may be incorporated by addition of, for example, tetraethoxysilane or of a silane corresponding to the following general formula $$R\, Si\, X_3 \qquad (II)$$

in which X is a hydrolyzable group, more especially the alkoxy radical, and R has the meaning defined for (I). R is preferably methyl and phenyl. However, crosslinking may also take place where, for example, vinyl and mercapto groups used at the same time react with one another in the emulsion polymerization of the siloxane constituents. In that case, there is no need to add an external crosslinking agent.

Known nonionic and/or anionic emulsifiers are used as the emulsifiers.

Examples of nonionic emulsifiers are adducts of ethylene oxide with compounds containing acidic hydrogen, such as fatty alcohols and fatty acids. The HLB value of the emulsifiers should be in the range which promotes the formation of o/w emulsions and is generally $\geq 10$. Suitable nonionic emulsifiers are, for example, POE (3)-lauryl alcohol, POE (20)-oleyl alcohol POE (7)-nonylphenol or POE (10)-stearate. The notation POE (3)-lauryl alcohol means that 3 units of ethylene oxide are added onto 1 molecule of lauryl alcohol, the number 3 representing an average value; the same applies to the other emulsifiers mentioned.

Suitable anionic emulsifiers are the alkali salts of fatty acids or the alkali, alkaline earth or amine salts of organic sulfonic acids, more especially alkylaryl sulfonic acids, of which examples are the sodium salts of dodecyl benzenesulfonic acid and lauryl sulfonic acid. Mixtures of nonionic emulsifiers and anionic emulsifiers may also be used. The catalysts used are acids, preferably surface-active acids, of which examples include sulfonic acids, such as alkyl sulfonic acids and alkylaryl sulfonic acids, for example dodecyl benzenesulfonic acid. Basically, any acids known as polymerization initiators may be used as catalysts, surface-active acids being preferred.

In the polymerization of the shell (b), the formation of new particles must be completely avoided. The emulsifier should only be present in a quantity just sufficient to cover the surface of the particles. The size of the particles may be varied within wide limits through the conduct of the reaction. Where an agglomerated latex is used as the core material (a), large particles which may contain several rubber particles are obtained. The polymerization of the shell (b) may also be carried out in such a way that particles having a core/shell structure and, at the same time, particles of pure organopolysiloxane are formed. According to the invention, mixtures such as these may also be used in special circumstances.

In a third step, the monomers forming the graft overlay are radically graft polymerized in the presence of the rubber, more especially at a temperature in the range from 40° to 90° C. This graft polymerization may be carried out in suspension, dispersion or emulsion, but is preferably carried out continuously or discontinuously in emulsion using radical initiators (from the group comprising peroxides, azo compounds, hydroperoxides, persulfates, perphosphates) and, optionally, anionic emulsifiers, such as carbonium salts, sulfonic acid salts or organic sulfates. The graft polymers are formed in high graft yields, i.e. a large proportion of the overlay polymer (c) formed is chemically attached, i.e. grafted onto, the silicone rubber. The special graft base (a+b) makes it unnecessary to take special measures to obtain high graft yields.

The resulting graft polymers may be worked up by known methods, for example by coagulation of the latices with electrolytes (salts, acids or mixtures thereof), followed by purification and drying.

The thermoplastic graft polymers according to German patent application P 37 20 475.0 are distinguished by a combination of many technically important properties of plastics materials, such as ageing stability; thermal stability, particularly during processing into molded articles; surface quality in molded articles; processibility, low-temperature toughness, ultimate strength.

Up to half and preferably up to one third of the thermoplastic polycarbonates (component (A) may be replaced by other thermoplasts (C), preferably by thermoplastic copolymers (C) of C.1 50 to 95 parts by weight and preferably 60 to 80 parts by weight of styrene, α-methyl styrene, nucleus-substituted styrene, methyl methacrylate or mixtures thereof and C.2 50 to 5 parts by weight and preferably 40 to 20 parts by weight of (meth)acrylonitrile, methyl methacrylate, maleic anhydride, N-substituted maleic imide or mixtures thereof, the sum of the parts by weight of C.1 and C.2 amounting in each case to 100. When one third is replaced, the remaining two thirds would consist of theromplastic polycarbonates (component A).

Other thermoplasts are those which are different from components (A) and (B).

Accordingly, the present invention also relates to molding compositions containing (A) 52 to 94% by weight and preferably 60 to 86% by weight of one or more polycarbonates and (B) 6 to 48% by weight and preferably 14 to 40% by weight of one or more of the graft polymers to be used in accordance with the invention, at most half the percentages by weight and preferably at most one third of the percentages by weight of component (A) being replaced by other thermoplasts (C), preferably by thermoplastic copolymers (C), prepared from C. 1 50 to 95 parts by weight and preferably 60 to 80 parts by weight styrene, α-methyl styrene, nucleus-substituted styrene, methyl methacrylate or mixtures thereof and C.2 50 to 5 parts by weight and preferably 40 to 20 parts by weight (meth)acrylonitrile, methyl methacrylate, maleic anhydride, N-substituted maleic imide or mixtures thereof, the sum of the parts by weight of C.1 and C.2 amounting in each case to 100 and the sum of the percentages by weight of components A)+(B)+(C) being 100% by weight in each case.

Preferred copolymers (C) are those of at least one monomer from the group comprising styrene, α-methyl styrene, nucleus-substituted styrene according to C.1 with at least one monomer from the group comprising acrylonitrile, methacrylonitrile, methyl methacrylate, maleic anhydride, N-substituted maleic imide according to C.2.

Copolymers of the type C are also formed as secondary products in the graft polymerization reaction for the preparation of component B (see pages 6 and 9 of the present application).

The quantity of copolymer (C) useable in accordance with the invention does not include these secondary products of the graft polymerization reaction.

The copolymers of component (C) are resin-like, thermoplastic and rubber-free. Particularly preferred copolymers (C) are those of styrene and/or o-methyl styrene with acrylonitrile and, optionally, with methyl methacrylate. Particularly preferred ratios by weight in the thermoplastic copolymer (B) are 60 to 80% by weight C.1 and 40 to 20% by weight C.2.

The copolymers (C) are known and may be prepared by radical polymerization, more especially by emulsion, suspension, solution or mass polymerization. They preferably have molecular weights $\bar{M}w$ (weight average, as determined by light scattering or sedimentation) of from 15,000 to 200,000.

The polycarbonate molding compositions according to the invention may contain other additives known for components (A), (B) or (C), such as stabilizers, pigments, mold release agents, flameproofing agents and/or antistatic agents, in the usual quantities.

The molding compositions according to the invention containing components (A), (B) and, optionally, (C), stabilizers, pigments, mold release agents, flameproofing agents and/or antistatic agents may be prepared by mixing the constituents in known manner and melt-compounding or melt-extruding the resulting mixtures at temperatures of 200° to 330° C. in standard machines, such as internal kneaders, extruders or twin-screw extruders.

Accordingly, the present invention also relates to a process for the production of thermoplastic molding compositions containing components (A), (B) and, optionally, (C), stabilizers, pigments, mold release agents, flameproofing agents and/or antistatic agents, characterized in that the respective constituents are mixed and the resulting mixtures are melt-compounded or melt-extruded in standard machines at temperatures of 200° to 330° C.

The constituents may be mixed gradually or all at once both at around 20° C. (room temperature) and also at higher temperatures.

The molding compositions according to the invention may be used for the production of molded articles of all kinds. In particular, molded articles may be produced by injection molding. Examples of molded articles are parts of housings (for example for domestic appliances, such as juice presses, coffee machines, mixers), cover panels for buildings and car components. They are also used for electrical components, for example multiway connectors, because they show very good electrical properties.

Molded articles may also be produced by deep drawing from prefabricated sheets or films.

Particle size always means the average particle diameter $d_{50}$ as determined by ultracentrifuge measurements in accordance with W. Scholtan et al., Kolloid-Z. and Z. Polymere 250 (1972), 782–796.

EXAMPLES

Polycarbonates and copolymers
(A) Linear polycarbonate based on bisphenol A having a relative solution viscosity $\eta_{rel}$ of 1.26 to 1.28, as measured on a solution in $CH_2Cl_2$ (concentration 0.5 g/ 100 ml) at 25° C.
(C) Styrene/acrylonitrile polymer (styrene: acrylonitrile ratio 72:28) having a limiting viscosity number ($\eta$) of 0.55 dl/g (as measured in dimethylformamide at 20° C.).

Preparation of a graft polymer B to be used in accordance with the invention in accordance with German patent application P 37 20 475.0 (Le A 25 251).

1. Preparation of a core material (a)
10,300 parts water, 5 parts Na salt of $C_{14}$–$C_{18}$ alkyl sulfonic acids, 800 parts n-butyl acrylate and 4 parts triallyl cyanurate are introduced into a reactor. After heating to 70° C., the polymerization is initiated by addition with stirring of a solution of 30 parts potassium peroxodisulfate in 1000 parts water. The following solutions are then introduced into the reactor over a period of 5 hours at 70° C.:

| Solution 1: | 9150 parts n-butyl acrylate |
| --- | --- |

| Solution 2: | 46 parts triallyl cyanurate |
| --- | --- |
| | 7000 parts water |
| | 200 parts Na salt of $C_{14}$–$C_{18}$ alkyl sulfonic acids |

The mixture is then polymerized to completion over a period of 4 hours at 70° C. The latex obtained has a solids content of 35.9%, a pH value of 3.2 and an average particle size ($d_{50}$ value) of 0.18 μm. The polymer is partly crosslinked and has a gel content of 89%, as measured in DMF. The glass temperature of the core material is −48° C.

2. Preparation of rubber particles B.2 (a+b)
200 parts acrylate latex (1) and 5 parts octamethyl cyclotetrasiloxane are introduced under nitrogen into a reactor, after which the reaction mixture is heated to 85° C. and stirred for 2 hours. After addition of a solution of 1.5 parts dodecyl benzenesulfonic acid and 1.5 parts $C_{12}$–$C_{14}$ alkyl sulfonic acid, sodium salt, in 125 parts water, the mixture is stirred for 1 hour at 85° C. A mixture of 95 parts octamethyl cyclotetrasiloxane and 2.5 parts tetramethyl tetravinyl cyclotetrasiloxane is then introduced over a period of 2 hours. The polymerization is completed over a period of 24 hours at 80° C. and the stable emulsion (latex 2) formed is cooled to room temperature. It contains the multiphase polymer in a concentration of 36%. The particle size is 0.15 μm. The polymer is partly crosslinked and has a gel content of 87%. It consists of 40% acrylate rubber and 60% organopolysiloxane.

3. Graft polymer B (B.2 +B.1)
2089 parts by weight latex (2) and 1070 parts by weight water are introduced into a reactor. After initiation with a solution of 7.5 parts by weight potassium peroxodisulfate in 195 parts by weight water at 65° C., the following solutions are uniformly introduced into the reactor over a period of 4 hours:

| Solution 1: | 540 parts by weight styrene |
| --- | --- |
| | 210 parts by weight acrylonitrile |
| Solution 2: | 375 parts by weight water |
| | 15 parts by weight sodium salt of $C_{14}$–$C_{18}$ alkyl sulfonic acids. |

The reaction mixture is then polymerized to completion over a period of 4 hours at 65° C. The monomer conversion comprises more than 98% by weight. The latex obtained has a solids content of approximately 33% by weight. After coagulation with an aqueous magnesium sulfate solution, filtration and drying in vacuo, the graft polymer is obtained in the form of a white powder. It has a rubber content of 50% by weight.

4. Comparison graft polymer B*
An ASA graft polymer of 60% by weight coarse, highly crosslinked particulate acrylate rubber and 40% by weight of a styrene/acrylonitrile mixture in a ratio of 72:28, average particle size ($d_{50}$) approximately 400 nm. The product was prepared by emulsion polymerization using known methods, as described for example in EP 34 748 (pages 8 et seq.).

5. Preparation of the molding compositions according to the invention
Components (A), (B) and (C) were compounded in a 3 liter internal kneader at temperatures of 200° to 220° C.

The molded articles were prepared in an injection molding machine at 260° C.

Notched impact strength was measured by the Izod method on bars measuring 2.5×½×⅛" in accordance with ASTM-D-256.

As shown in the following Table, the molding compositions according to the invention show a distinctly higher toughness level, particularly at low temperatures, than the comparison molding composition for the same rubber content. weather resistance of both molding compositions is good.

| Components | | | | Notched impact strength (J/m) | | |
|---|---|---|---|---|---|---|
| A | B | B* | C | room temperature | −20° C. | −50° C. |
| According to the invention | | | | | | |
| 60 | 24 | | 16 | 737 | 531 | 474 |
| Comparison | | | | | | |
| 60 | | 20 | 20 | 620 | 287 | — |

The total rubber content is 12% in both cases.

What is claimed is:

1. Thermoplastic polycarbonate molding compositions containing:
   A: 52 to 94% by weight of a component consisting of 50–100% by weight of one or more polycarbonates, and 0–50% by weight of a thermoplastic polymer prepared from
   C.1 50 to 95 parts by weight of styrene, α-methyl styrene, nucleus-substituted styrene, methyl methacrylate or mixtures thereof and
   C.2 50 to 5 parts by weight (meth)acrylonitrile, methyl methacrylate, maleic anhydride, N-substituted maleic imide of mixtures thereof, the sum of the parts by weight of C.1 and C.2 amounting in each case to 100;
   B. 6 to 48% by weight of one of more particulate graft polymers, characterized in the graft polymers are prepared from
   B.1 20 to 90 parts by weight of a polymer graft overlay of at least one α-β unsaturated olefinic monomer on
   B.2 80 to 10 parts by weight of a graft base having a core/shell structure consisting of a core (a) of a rubber polymer of olefinically unsaturated monomers having a glass temperature (Tg) of <0° C. and a polymer (b) of organopolysiloxane, the ratio by weight of the core (a) to the shell (b) being from 0.1:99.9 to 90:10 and the graft polymers (B) having an average particle diameter ($d_{50}$) of 0.05 to 10 μm and the sum of the parts by weight of B.1 and B.2 always amounting to 100 parts by weight.

2. The thermoplastic molding compositions as claimed in claim 1 wherein component A consists of 100% by weight of one or more polycarbonates.

3. Thermoplastic polycarbonate molding compositions as claimed in claim 2, characterized in that the core (a) in the graft polymer (B) has a glass temperature of < −20° C.

4. Thermoplastic polycarbonate molding compositions as claimed in claim 2, characterized in that the core (a) in the graft polymer (B) has a glass temperature of < −40° C.

5. Molding compositions as claimed in claim 2, containing
   (A) in quantities of 60 86% by weight and
   (B) in quantities of 14 to 40% by weight.

6. Molding compositions as claimed in claim 2, characterized in that component (B) is prepared from 30 to 80 parts by weight B.1 and 70 to 20 parts by weight B.2.

7. Molding compositions as claimed in claim 6, characterized in that component (B) is prepared from 45 to 75 parts by weight B.1 and 25 to 55 parts by weight B.2.

8. Molding compositions as claimed in claim 2, characterized in that the ratio by weight of the core (a) to the shell (b) in the graft polymer (B) is from 10:90 to 50:50.

9. Molding compositions as claimed in claim 2, characterized in that the average particle diameter ($d_{50}$) is from 0.1 μm to 2 μm.

10. Molding compositions as claimed in claim 9, characterized in that the average particle diameter ($d_{50}$) is from 0.1 μm to 1 μm.

11. Thermoplastic polycarbonate molding compositions containing:
    A. 50 to 94% by weight of a component consisting of 66⅔ –100% by weight of one or more polycarbonates, and 0–33⅓% by weight of a thermoplastic polymer prepared from
    C.1 50 to 95 parts by weight of styrene, α-methyl styrene, nucleus-substituted styrene, methyl methacrylate or mixtures thereof and
    C.2 50 to 5 parts by weight of (meth) acrylonitrile, methyl methacrylate, maleic anhydride, N-substituted maleic imide or mixtures thereof, the sum of the parts by weight of C.1 and C.2 amounting in each case to 100;
    B. 6 to 48% by weight of one or more particulate graft polymers, characterized in that the graft polymers are prepared from
    B.1 20 to 90 parts by weight of a polymer graft overlay of at least one α-β-unsaturated olefinic monomer on
    B.2 80 to 10 parts by weight of a graft base having a core/shell structure consisting of a core (a) of a rubber polymer of olefinically unsaturated monomers having a glass temperature ($T_g$) of <0° C. and a polymer (b) of organopolysiloxane, the ratio by weight of the core (a) to the shell (b) being from 0.1:99.9 to 90:10 and the graft polymers (b) having an average particle diameter ($d_{50}$) of 0.05 to 10 μm and the sum of the parts by weight of B.1 and B.2 always amounting to 100 parts by weight.

* * * * *